United States Patent [19]

Murakami

[11] 3,760,390

[45] Sept. 18, 1973

[54] CYLINDRICAL DOMAIN ASSOCIATIVE MEMORY APPARATUS

[75] Inventor: Hiroshi Murakami, Tokyo, Japan

[73] Assignee: Nippon Electric Company, Limited, Tokyo, Japan

[22] Filed: May 9, 1972

[21] Appl. No.: 251,622

[30] Foreign Application Priority Data

June 4, 1971 Japan .............................. 46/39449

[52] U.S. Cl. 340/174 GA, 340/174 TF, 340/174 SR

[51] Int. Cl. ........................ G11c 15/00, G11c 11/14

[58] Field of Search .............. 340/174 TF, 174 GA, 340/174 SR

[56] References Cited

UNITED STATES PATENTS

| | | | |
|---|---|---|---|
| 3,680,067 | 7/1972 | Chow | 340/174 TF |
| 3,541,522 | 11/1970 | Bobeck et al. | 340/174 TF |
| 3,641,518 | 2/1972 | Copeland | 340/174 TF |
| 3,646,530 | 2/1972 | Chow | 340/174 TF |
| 3,678,287 | 7/1972 | Chow | 340/174 TF |

*Primary Examiner*—Stanley M. Urynowicz, Jr.
*Attorney*—Richard C. Sughrue et al.

[57] ABSTRACT

An associative memory utilizing magnetic domain storage for selecting a stored memory word in response to an interrogating search word. A search word is compared to the tag bits of all memory words by proximately circulating magnetic domains corresponding to the memory word tag bits and the search word. For each memory word comparison process, there is a single domain placed in a first location. The circulation of the domains corresponding to the memory word tag bits and the domains corresponding to the search word causes corresponding bits, represented by the presence or absence of domains, of said tag bits and search word to simultaneously appear adjacent to said first location. If the adjacent bits are identical no resultant repelling force is applied to the domain in said first location. However, if the adjacent bits are not identical, i.e., one adjacent location contains a domain whereas the other adjacent location does not contain a domain, a resultant repellant force causes the domain in said first location to move away from said first location. After the circulation is complete, the existence of a domain in said first location, indicates that the search word is the same as the tag bits in the storage area near the first location.

6 Claims, 12 Drawing Figures

CYLINDRICAL DOMAIN ASSOCIATIVE MEMORY APPARATUS

BACKGROUND OF THE INVENTION

The present invention relates to an associative memory apparatus employing cylindrical magnetic domain elements, and more particularly, to a comparing circuit incorporated in such an apparatus.

An associative memory apparatus operates in response to an interrogating search word, to select a stored memory word which is partially or wholly identical to the search words, to read out the selected memory words, and to rewrite all or a portion of each selected memory word in storage.

An associative memory apparatus is distinguishable from memory devices of the type which read out a memory word located at the address corresponding to the input address designation. In an associative memory, all memory words are compared, at least in part, with the interrogating search word, and thus accessed with the memory contents used as clues.

The associative memory apparatus or an electronic computer having the associative memory apparatus finds wide application in file maintenance, pattern recognition, information retrieval, etc.

The following magnetic memory elements are known to be useful in an associative memory apparatus employing a memory matrix array: ring-shaped magnetic cores, transfluxers, biax cores. An apparatus using such elements is capable of performing search operations, besides the ordinary memory operations, without destroying memory contents. As a consequence, the shape of the elements tends to be complicated, the match-to-mismatch signal ratio can not be made large enough and the peripheral circuits become complicated. Also, since the elements mentioned above are produced individually, a associative memory apparatus having a large storage capacity is very costly to manufacture.

With the progress of semiconductor integrated circuit technology in recent years, semiconductor memory elements have been used in matrix type associative memory apparatus in place of the magnetic memory elements. However, to construct large-capacity associative memories with such elements, solutions must be found for several problems, such as the high cost of elements, large power consumption, and the volatility of stored information.

To provide a large-capacity memory apparatus free from these problems, a circulating memory is more favorable than a matrix type associative memory. In the associative memory apparatus using circulating memories, the comparing operation is carried out by comparing the memory word read out at high speed from the circulating memories with an externally designated search word. Magnetic memories such as magnetic drums, fixed head type magnetic disks or semiconductor shift registers may be used as circulating memories.

However, the disadvantages of the magnetic memories are as follows:

1. The peripheral circuits become more expensive when the width of transfer of the memory word is elonged to realize a high data rate for high speed comparison;

2. Extra units for accessing memory words are needed in response to the result of comparison; and 3. In the presence of mechanical parts, preventive maintenance work is required.

On the other hand, the disadvantages in the use of semi-conductor shift registers are as follows:

1. Some considerations must be given to the volatility of memory content;

2. The bit density of the circuit elements is low;

3. In as much as stored information must be kept circulated in some kinds of shift registers, the control operation becomes complicated;

4. The power consumption per bit of stored information is large; and

5. The cost of manufacture per bit becomes high.

An associative memory apparatus free from the abovementioned disadvantages can be realized by using magnetic material of the type which holds cylindrical magnetic domains therein. More specifically, the memory element is composed essentially of a sheet of magnetic material having permalloy patterns or conductors. A memory element of this type is extremely simple to construct and has a large bit density. In addition, if such a memory element is employed, power consumption required for movement of magnetic domains representing information is small and no mechanical parts are needed for the movement. Also, since a permanent magnet can be used to generate a uniform bias magnetic field, the memory content can be made non-volatile, permitting logic operations to be performed between magnetic domains.

Details of the characteristics of cylindrical magnetic domains are not discussed herein for simplicity of the explanation. A description of the general characteristics of cylindrical magnetic domains is given in the "THE BELL SYSTEM TECHNICAL JOURNAL," October issue, 1967, pages 1901 through 1925 (Reference 1). Moreover, the application of magnetic domains to logic circuits or memories is shown in "AFIPS CONFERENCE PROCEEDINGS," vol. 35, pages 489 through 498 (Reference 2). Furthermore, the general evaulation of associative memory apparatus is given in "IEEE TRANSACTIONS ON ELECTRONIC COMPUTERS," Vol EC-15 (August 1966), pages 509 through 521 (Reference 3). The associative memory apparatus using cylindrical magnetic domains has been disclosed in the U.S. Pat. No. 3,541,522 published on Nov. 17, 1970.

In the apparatus described in the above-mentioned patent, search operations relying on an input "tag" (search word) for match tags of memory words comprise a comparing operation performed at each bit position of each match tag (FIGS. 23 through 29) and a bit serially processing operation for the result of comparison (FIGS. 30 through 35). The stage of magnetic domains in these operations is indicated in FIGS. 23 to 35 of the patent. The comparing operation includes "replicate" shown in FIGS. 23 and 24, "move to logic area" shown in FIGS. 24 and 25, "invert" illustrated in FIGS. 25 through 28, and "type A to type B rotation" illustrated in FIGS. 28 and 29. In these operations, the movement of magnetic domains from one block to another and the splitting of the magnetic domain are performed. For simplicity, it is assumed that time required for the movement or the splitting of the magnetic domain is T. Then, time required for the operations "replicate" is 3T; that for "move to logic area" is 6T multiplied by the number of bits of match tag plus 3T; that for "invert" is 8T; and that for "typeA to type B rotation" is 6T.

The processing operation for the result of comparison is carried out by a succession of MINOR AND operations (FIGS. 29 to 35). These processing operations include the first processing operation of comparison results of the *n*-th bit position and that of the (*n*—1)th bit position of each match tag at first (FIGS. 29 through 32), the second processing operation of the results of the first processing operation and the comparison results of the (*n*—2)th bit position of each match tag at second, and so on. As a result, the time for processing the comparison result in 7T multiplied by the number of bits of input tag minus 1.

In the patented information processing system using magnetic domain elements for performing the above-mentioned operations, the basic operational unit is composed of 54 blocks as indicated in FIG. 2, with 54 possible magnetic domain positions being given to one bit. This makes the bit density extremely low. Also, even if such a configuration of magnetic domain elements position construction is adopted, the time required for obtaining a match signal is proportional to the number of bits of the match tag.

In other words, numerous magnetic domain positions are installed so as to perform the search operation in the bit-parallel and word-parallel fashion regardless of the fact that the performance of the search operation makes no intrinsic difference from the one which performs the same operation in the bit-serial work-parallel fashion. For this reason, such a system becomes complicated in construction and hence very costly to manufacture, as compared with the information processing system using domain elements for performing search operation in the bit-serial word-parallel fashion.

Moreover, in the system, complicated magnetic field patterns must be provided in each of the logic portions of a magnetic material sheet for performing particular operations as mentioned above. This is because search operation in the proposed system is carried out in the bit-parallel and word-parallel form. These disadvantages can be eliminated by performing search operation in the bit-serial word-parallel fashion.

SUMMARY OF THE INVENTION

It is, therefore, one object of this invention to provide a large-capacity associative memory apparatus capable of performing high-speed search operation without involving extra cost in manufacture.

The associative memory apparatus of this invention having read-out, write-in and search functions for information, and employing cylindrical magnetic domain elements, comprises: a cylindrical magnetic domain sheet containing a part 6 for storing N memory words to be searched, a part 7 for storing N identical search words, and a part 8 for storing N identifying bits; means for writing said memory words to be searched into the part 6; means for writing the N identical search words into the part 7; means for arranging magnetic domains for the N identifying bits into N first positions in the part 8; means for moving the corresponding bits of N memory words to be searched and N search words in the vicinity of the first positions; means for comparing the corresponding bits propagated in the vicinity of the first positions and, in case of non-coincidence, for moving the magnetic domains for the identifying bits from each first position to one or more other positions; means for detecting the magnetic domains for each identifying bit upon completion of the comparison; and means for fixing the magnetic domains for each identifying bit in the first positions in comparing the masked bit position.

Some rules of illustration followed throughout this specification are given here before entering into detailed description of this invention.

Figures 1A, 1B, 2:
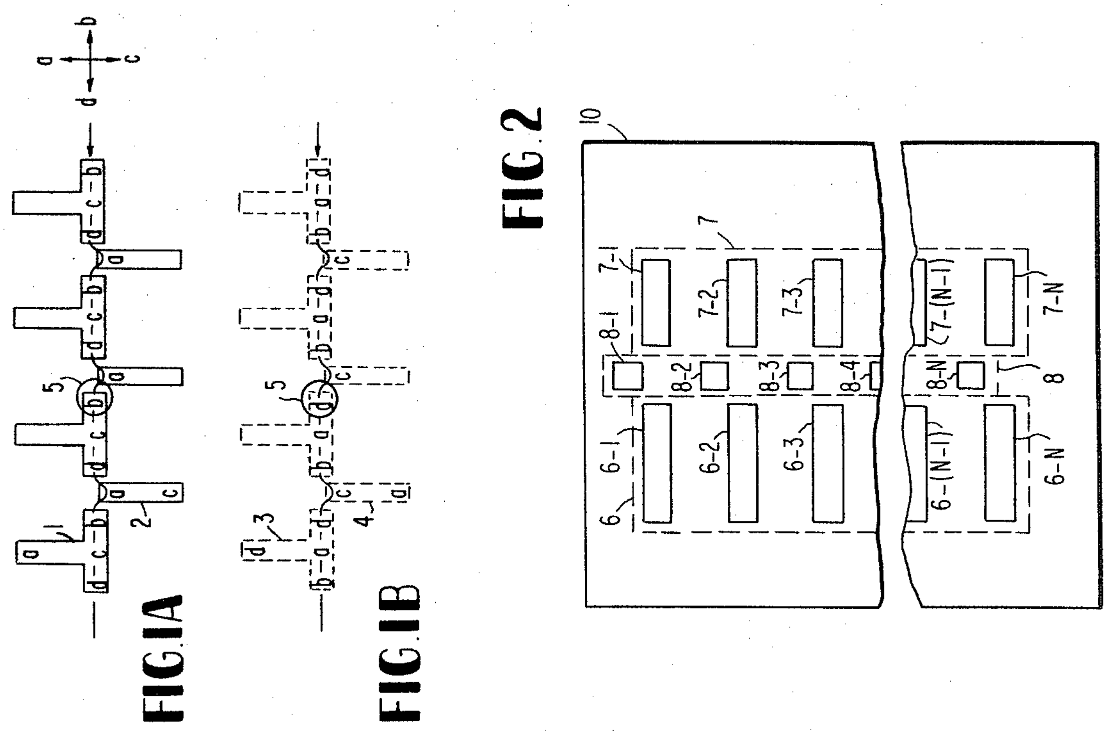
FIGS. 1A and 1B show diagrams of the well-known magnetic domain propagation arrangement for illustrating some rules of domain movement followed throughout the instant specification and drawings.
FIG. 2 shows a block diagram of one embodiment of this invention.

FIGS. 1A and 1B show a plan view of the surface of a sheet of magnetic material (cylindrical magnetic domain sheet) such as of orthoferrite in which cylindrical magnetic domains (single wall domains) can be moved.

It is assumed here, that a plurality of ferromagnetic material pieces for moving the magnetic domains are disposed on the top surface of the sheet as indicated in solid line in FIG. 1A, whereas on the rear surface as indicated in dashed line in FIG. 1B. The direction of magnetization of the magnetic domain is in the direction perpendicular to the plane of the sheet of the drawing, in other words, the direction from the upper surface of the sheet to the lower surface. On the other hand, a biassing magnetic field is applied to the direction from the lower surface of the sheet to the upper surface. The symbols shown by the arrows at the upper right-hand portion indicate the directions of a rotating magnetic field applied parallel to the surface of the sheet. It is assumed herein that the magnetic field rotates in the order of *a, b, c, d*, . . . . in succession.

The rotating magnetic field is in the plane of the orthoferrite and therefore is in the plane of the ferromagnetic pieces 1, 2, 3, 4 etc. The rotating magnetic field magnetizes the the ferromagnetic pieces and causes the respective North and South magnetic poles on any piece to rotate also. For the example described, domains are attracted and held by North poles on the upper surface ferromagnetic pieces and by South poles on the lower surface pieces. In FIG. 1A, the lower case letters on the ferromagnetic pieces indicate the position of a North pole when the rotating field is in the direction corresponding to the arrow defined by the same lower case letter. In other words, when the magnetic field is in direction *a*, a North pole exists at point *a* on piece 1 and at point *a* on piece 2. Also, a South pole exists at point *a* on piece 3 and at point *a* on piece 4.

In FIGS. 1A (and 1B), the plan view of a cylindrical magnetic domain 5 is shown. Since magnetic fields generated by the poles N(S) of the pieces coincide with the direction of magnetization of the magnetic domains, the magnetic domains tend to stay in the vicinity of N(S) poles. Accordingly, as the magnetic field rotates sequentially in the directions *a*, *b*, *c* and *d*, the magnetic domain propagates along the positions *a*, *b*, *c* and *d*, of the pieces regardless of whether the ferromagnetic material pieces are disposed on the upper or the lower surface.

In FIG. 2 which shows a block diagram of one embodiment of the invention, more particularly, a functionally divided state of a cylindrical magnetic domain sheet 10 for use in an associative memory apparatus of this invention, the sheet 10 comprises a part 6 consisting of blocks 6-1 through 6-N for storing N memory words to be searched, a part 7 formed by blocks 7-1 through 7-N for storing N identical search words, and a part 8 composed of blocks 8-1 through 8-N for storing the identifying bits.

It is not necessary that the bit number of each memory word (referred to simply as word hereinafter) should be equal to that of search word. More specifically, the former is larger than the latter in general.

In the following description, binary "1" and "0" correspond respectively to the presence and absence of a magnetic domain. Therefore, the magnetic domain propagation signifies the same meaning as the binary information propagation.

Figure 3:
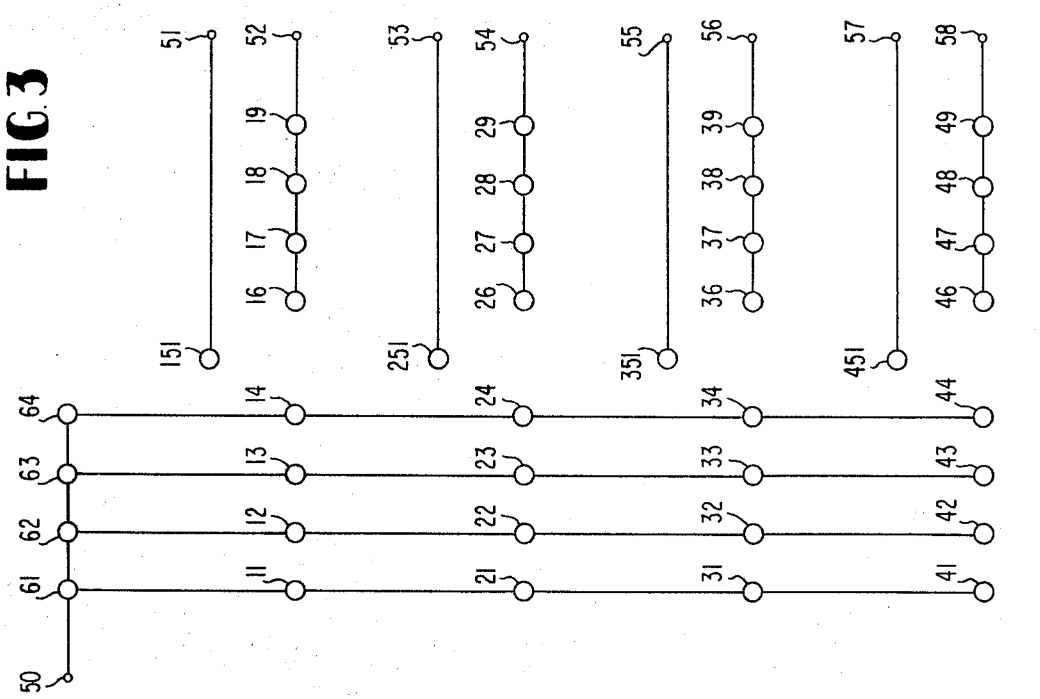
FIG. 3 shows a diagram of the principal parts of means for writing memory words to be searched, search words, and identifying bits respectively in parts 6, 7 and 8 shown in FIG. 2.

FIG. 3 shows a schematic diagram of the principal parts of means for writing memory words, search words, and identifying bits in parts 6, 7, and 8, respectively. In the drawings, circles denote positions at which cylindrical magnetic domains exist stably and the solid lines between the circles denote routes of propagation of the domains. Each memory word or at least the tag portion of each memory word consists of four bits and is stored in cylindrical magnetic domain positions 11, 12, 13, 14; 21, 22, 23, 24; 31, 32, 33, 34; and 41, 42, 43, 44.

The words or tag portions are written in as follows: Magnetic domains corresponding to a word are applied one by one from an input position 50 and are spatially arranged in cylindricale magnetic domain positions 61, 62, 63 and 64 and then, they are shifted to the lower positions 11, 12, 13 and 14, respectively. After another word has been arranged in the positions 61, 62, 63 and 64, the previous word in the position 11, 12, 13 and 14 is shifted to positions 21, 22, 23 and 24 and at the same time, the word in the positions 61, 62, 63 and 64 is shifted to positions 11, 12, 13 and 14. By the repetition of such operations, words are stored in all of the positions 11 through 14, 21 through 24, 31 through 34, and 41 through 44. These positions constitute the part 6.

The magnetic domains indicating search words and those indicating identifying bits may be simultaneously written in. It is assumed that magnetic domains in positions in which the above-mentioned magnetic domains are scheduled to be located have been erased.

Binary information (1 0 0 0 0) is supplied in time sequential form from input positions 51, 53, 55 and 57. Binary information (O X X X X) is applied in time sequential form from positions 52, 54, 56 and 58. Incidentally, the notation (X X X X) denotes information of search word, and X takes either 1 or 0. As a result, the same search word is stored in positions 16–19, 26–29, 36–39 and 46–49, all of which constitute part 7. Also, magnetic domains for the identifying bits are disposed in each of positions 151, 251, 351, and 451, which are the first positions of the part 8.

The magnetic domains indicating search words and those for the identifying bits need not be written in simultaneously. Furthermore, as will be mentioned later, magnetic domains representing the memory words and the search word must be disposed in the magnetic domain position so that the corresponding bits of each word and search word can be compared.

For the realization of the magnetic domain positions and propagation routes shown in FIG. 3, conductors which are driven by three kinds of current pulses and drive circuits are required. One such conductor pattern is shown in FIG. 9 on page 493 of the Reference 2.

Figure 4:
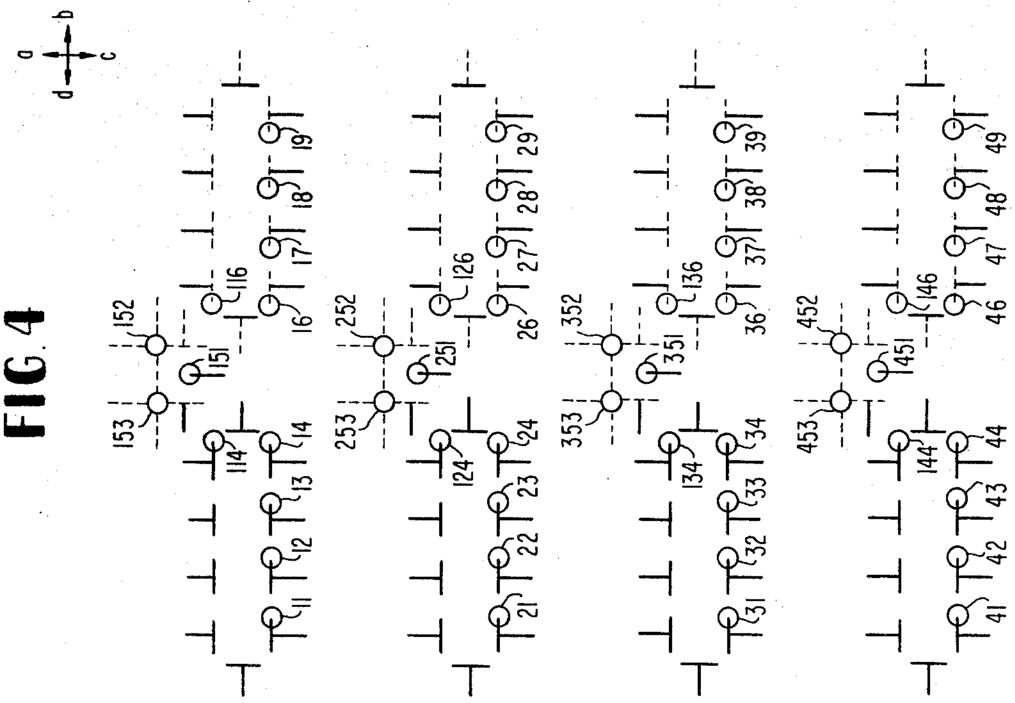
FIG. 4 shows a diagram illustrating in detail means for performing search operation in connection with the block diagram of FIG. 2.
Figures 6A, 6B, 6C, 6D, 6E, 7:
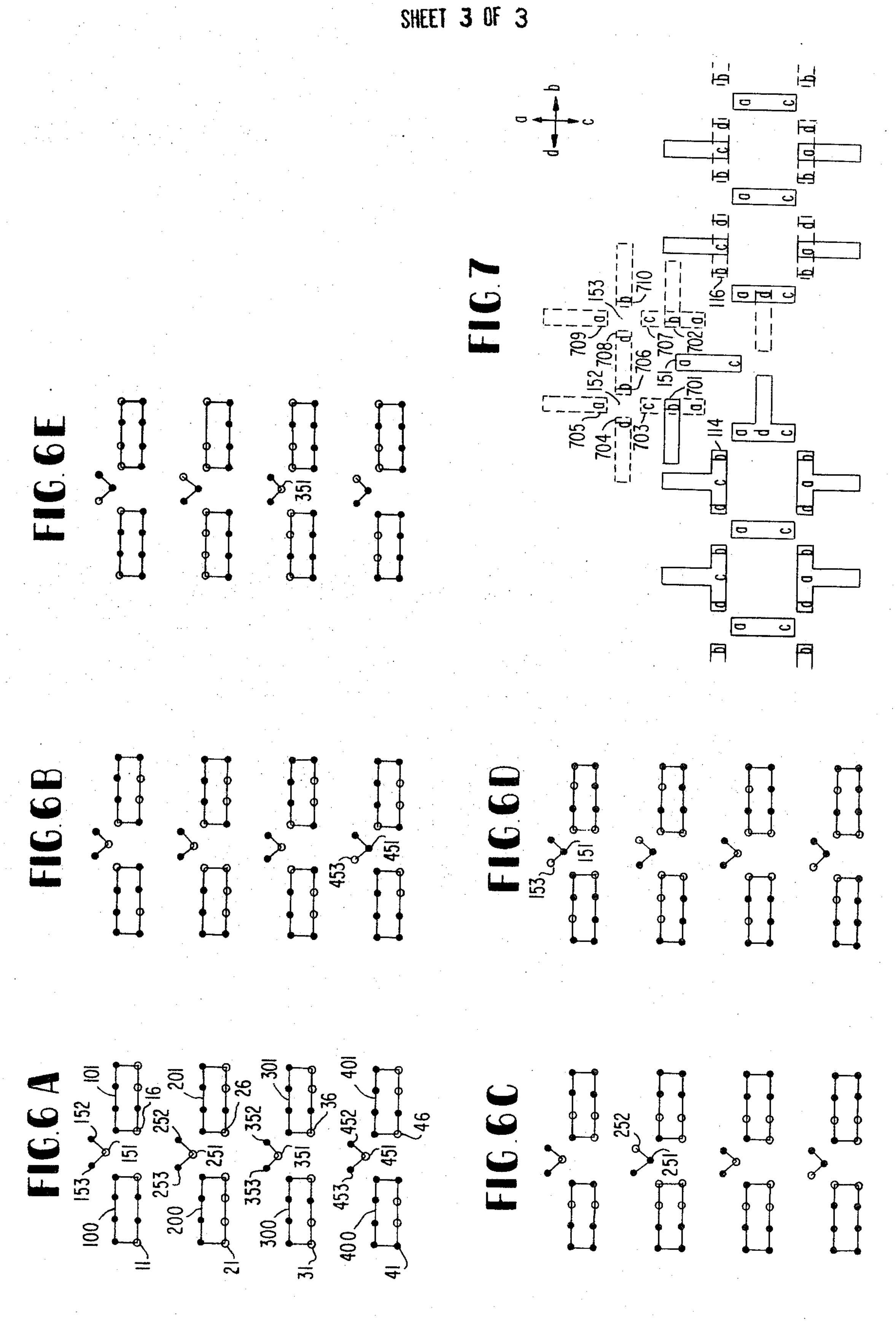
FIGS. 6A, 6B, 6C, 6D and 6E show diagrams of the disposition of domains in search operation.
FIG. 7 shows a diagram for explaining the movement of magnetic domains for expressing the identifying bits.

A more detailed drawing of the memory word, search word, and identifying bit storage locations are shown in FIG. 4. However, it should be understood that T bar patterns illustrated are only shown for the purpose of explaining the circulation of magnetic domains during the search and compare phase of operation. An accurate drawing of the layout of the permalloy elements is shown in FIG. 7, to be described later.

Those other than magnetic domain positions indicated by circles in FIG. 4 are permalloy patterns made of ferromagnetic material pieces for propagation of the magnetic domains. In these patterns, portions as indicated in solid line and dotted line are respectively disposed on the upper and lower surfaces of the magnetic domain sheet.

Upon application of a magnetic field which rotates clockwise or counterclockwise, the magnetic domains corresponding to the words in the positions 11–14, 21–24, 31–34, and 41–44 and those corresponding to the identical search words in the positions 16–19, 26–29, 36–39, and 46–49 move in a manner similar to FIG. 1.

The magnetic domains corresponding to the identifying bit are disposed in the first positions 151, 251, 351 and 451 and are stored as "1." These magnetic domains can be moved to second positions 152, 252, 352 and 452 and third positions 153, 253, 353 and 453, respectively. When moved as such, the identifying bit is assumed to be "0."

Figure 5:
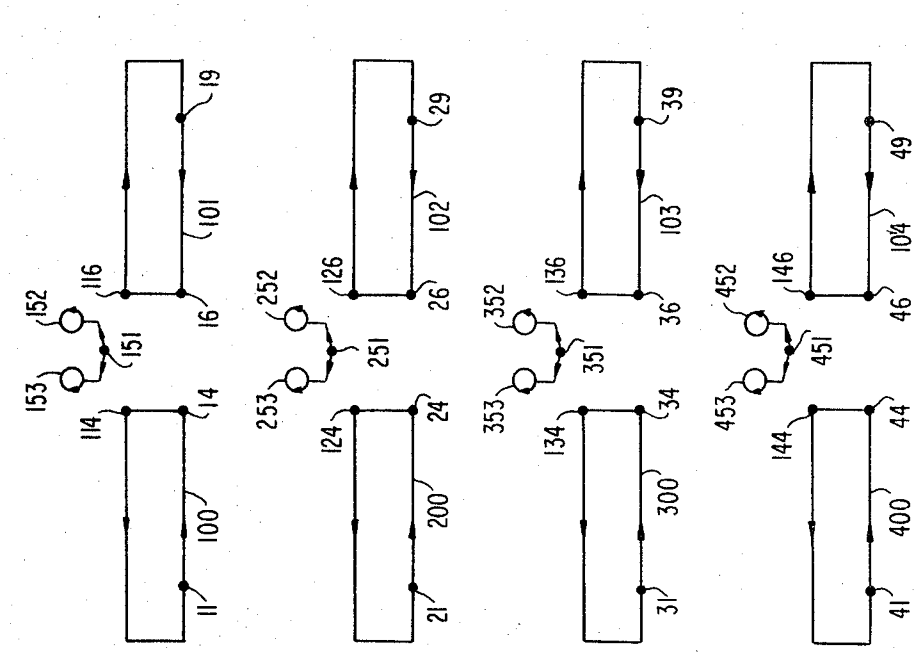
FIG. 5 shows a diagram of propagation routes for the magnetic domains shown in FIG. 4.

In FIG. 5, which shows a diagram of the propagation routes of magnetic domains when the rotating magnetic field is applied in FIG. 4, the same numerals are used for the positions corresponding to those shown in FIG. 4. Moreover, the arrow indicates the direction in which a magnetic domain moves as the clockwise rotating magnetic field is applied. The direction of movement of the magnetic domain upon application of the counterclockwise rotating magnetic field is opposite to that indicated by the arrow.

Loops 100, 200, 300, and 400 and loops 101, 201, 301, and 401 indicating magnetic domain propagation routes formed of the permalloy patterns provide means for propagating bits corresponding to the words and the search words in the vicinity of the first positions 151, 251, 351, and 451 of the magnetic domains for the identifying bits.

When the clockwise rotating magnetic field is supplied, information of the words in the positions 11–14, 21–24, 31–34, and 41–44 propagate in the loops 100, 200, 300, and 400 counter-clockwise.

As long as the magnetic field continues to rotate, propagation of the information in the loops is also continued maintained. In the same manner, information of the search words in the positions 16–19, 26–29, 36–39 and 46–49 propagate in the loops 101, 201, 301 and 401 upon application of the clockwise rotating magnetic field. As a result, corresponding bits of each memory word and search word pass through positions 114 and 116, 124 and 126, 134 and 136, and 144 and 146, simultaneously.

The first position 151, 251, 351 and 451, the second positions 152, 252, 352, and 452, the third position 153, 253, 353, and 453, the magnetic domain propagation routes between the first and the second positions, and the magnetic domain propagation routes between the first and the third positions are employed in combination as a means for comparing corresponding bits of each word and search word and for propagation of the magnetic domains for each identifying bit from the first to the second or third positions.

Now referring to FIG. 4 again, the magnetic domain in the first position 151 stays in that position insofar as information in the position 114 coincides with that in the position 116. In case of non-coincidence of information in the positions 114 and 116 that is, if they are "1" and "0," or "0" and "1," the magnetic domain in the position 151 moves to the second position 152 or the third position 153. This is due to the fact that the horizontal component of the repelling force exerted on the magnetic domain in the position 151 is caused by the magnetic domains in the positions 114 and 116, and if a domain is present in only one of those positions, there will be a resultant force on the domain in location 151 causing the latter domain to move to position 152 or 153. If the word in the loop 100 and search word in the loop 101 are the same in each bit position, the magnetic domain for the identifying bits stay in the position 151. If non-conincidence exists in one or more bit positions, the magnetic domain in the position 151 moves to the second position 152 or the third position 153 and stays there.

Similar operations are carried out with respect to the magnetic domains for the identifying bits located in the first positions 251, 351, and 451. At masked bit positions the magnetic domains representing each identifying bit in the first positions must stay in those positions irrespective of the contents of word bits and search word bits.

For this purpose, conductors having loops around the first positions and means for supplying current to the conductors for producing a magnetic field in the direction of magnetization of a magnetic domain in comparing the masked bit position must be provided. If the presence of the magnetic domain is detected in the first position after the completion of the comparison between word and search word, in other words, if the identifying bits is "1," the word having identifying bit of "1" coincide with the search word.

Means for detecting magnetic domains for each identifying bit may be composed of the magnetic domain propagation routes for supplying magnetic domains to the first positions, that is, magnetic domain propagation routes between the input positions 51, 53, 55, 57 and the first positions 151, 251, 351, and 451 and transducers for detecting magnetic domain installed in the propagation routes, such as magnetic resistance elements and amplifiers. In cases where magnetic domains for each identifying bit are utilized as domains, the transducers are not needed. When the complementary output of each identifying bit is needed, magnetic domains in the second or third position may be used.

FIGS. 6A through 6E show diagrams illustrating the movement of magnetic domains representing words, search words, and identifying bits during a search operation.

FIG. 6A illustrates the state before the search operation. Magnetic domains exist in positions indicated by circles (o), but not in positions indicated by dots (·). The stored memory words are, reading from the top word location to the bottom: (1001), (1111), (1011), and (0110). The search word entered in every search word location is given as "1011."

When the magnetic field rotates clockwise one revolution, the state of FIG. 6B is realized. Because the first bit of the fourth word from the top and that of the search word are non-coincident, the magnetic domain in the first positon 451 moves to the third position 453. By one more clockwise revolution of the magnetic field, the state of FIG. 6C is realized.

Since the second bits of the second and fourth words from the top do not coincide with the second bits of the search word, the magnetic domain in the first position 251 moves to the second position 252. However, the magnetic domain previously moved to the third position 453 remains there. With further rotation of the magnetic field, the state of FIG. 6E is reached via the state of FIG. 6D. Finally, because only the third word (1011) matches the search word, the magnetic domain in the first position 351 remains unchanged, that is the identifying bit remains as "1."

FIG. 7 shows a diagram of propagation of magnetic domains for the identifying bit in detail. When the rotating magnetic field is in the direction *a*, the magnetic domain corresponding to the identifying bit is in the position 151. As the rotating magnetic field assumes the direction *b*, the bits corresponding to memory word and search word represented by the presence or absence of magnetic domains move to the positions 114 and 116, respectively.

The horizontal component of the force exerting on the magnetic domain in the position 151 is determined by an attracting force due to magnetic poles at a position 701 and a position 702 and a repelling force due to magnetic domains in the positions 114 and 116. Consequently, in the presence or absence of a magnetic domain in each of the positions 114 and 116, the resultant force in the horizontal direction acting on the magnetic domain in the position 151 is zero. However, when a magnetic domain is present in the position 114 and absent in the position 116, a repelling force in the right direction is exerted on the magnetic domain in the position 151 and the domain moves to the right. In this case, the attracting force of the magnetic pole in the position 702 overcomes that of the magnetic pole in the position 701, with the result that the magnetic domain reaches the position 702. Similarly, the magnetic domain in the position 151 reaches the position 701 when a magnetic domain is present in the position 116, but absent in the position 114.

As the rotating magnetic field rotates in the directions c and d, the magnetic domain in the position 701 reaches a position 704 via a position 703. If the magnetic field is kept applied, the magnetic domain merely moves through positions 705, 706, 703 and 704 one after another. In a similar manner, the magnetic domain in the position 702 reaches a position 708 via a position 707, and then merely moves through positions 709, 710, 707, and 708 sequentially.

Since the magnetic domain in the position 151 moves as described, it can be utilized as the domain for the bit (identifying bit) which identifies the matching memory word to the search word. The words are considered to match the search word, provided magnetic domains corresponding to words exist in the first positions.

The magnetic domains in the first positions can be derived from the positions 51, 53, 55 and 57 by changing the order of application of three kinds of pulses used for writing-in operation of search word and the identifying bit. If such magnetic domains are derivable from such positions, the words in the position match the search word.

In FIGS. 3 to 6, the number of bits per word is assumed as 4. This is because tag bits only corresponding to the four bits of search word have been indicated. As a practical matter, data bits besides tag bits exist. But description of data bits has been omitted herein for simplicity to clarify the principle of this invention. As has been mentioned, the bit number of the memory word is equal to or larger than the bit number of the search word. Accordingly, data bits other than tag bits of words can be read from the search-word-matched word by the use of identifying bit. In the foregoing embodiments of this invention, it is taken for granted that the comparison of memory words with search words is carried out after the entire bits of the search word have been stored in part 7 of a cylindrical magnetic domain sheet.

To provide space sufficient for storing the entire bits of search word in the part 7 is by no means necessary. Insofar as comparison between each word and search word is carried out simultaneously with the write-in operation of search word, space in the part 7 for storing the search word can be appreciably reduced.

While the foregoing description has been made assuming that the cylindrical magnetic domain sheet 10 constitutes a single sheet, it is possible, for instance, to prepare another cylindrical magnetic domain sheet for the part 8 for overlapping with one for the parts 6 and 7 in usage.

Furthermore, the principal search means is considered to be composed of ferromagnetic material pieces of types T and I as shown in FIG. 4, but the geometrical shape is by no means restricted to that illustrated — a combination of types Y and I will do.

It would be apparent, however, that a number of alternatives and modifications can be made within the scope of the present invention defined by the appended claims.

What is claimed is:

1. An associative memory of the type which responds to a search word to select a stored memory word having a tag group of bits identical to said search word, said memory comprising (a) magnetic structure made of a material capable of holding cylindrical magnetic domains therein when a bias magnetic field is applied thereto, (b) means for applying a bias magnetic field thereto, (c) N groups of domain holding means on said material, each of said groups comprising a memory tag word storage portion and an identifying bit storage portion, each said identifying bit storage portion comprising first, second and third domain holding locations, (d) means for entering magnetic domains into said N memory tag word portions corresponding respectively to the tag group of bits of N stored memory words, (e) means for entering at least one domain in the first holding location of each said identifying bit storage portions, (f) means on said material for holding magnetic domains corresponding to a search word, means for entering domains into said latter means corresponding to a search word, and (g) means for moving said tag groups and said search word within said respective portions and holding means to cause movement of said domains in said identifying bit storage portions from said first locations to said second locations or third locations if and only if the tag group of bits in the corresponding tag word storage portion is not identical to said search word.

2. An associative memory as claimed in claim 1 wherein said means for holding magnetic domains corresponding to a search word comprises N identical search word holding means, each positioned adjacent a respective one of said N identifying bit storage portions, and wherein said means for entering domains into said latter means comprises means for entering domains representing said search word into each of said N identical search word holding means.

3. An associative memory as claimed in claim 2 wherein each said identifying bit storage portion comprises magnetic elements arranged on at least one surface of said material, said magnetic elements being of the type which switch magnetic poles in response to a planar rotating magnetic field whereby said poles attract and hold domains, said magnetic elements being arranged to cause a domain at said first location to move to said second location or third location in response to a rotating magnetic field if and only if an unbalanced repelling force is applied to said domain along a first axis when said domain is in said first location.

4. An associative memory as claimed in claim 3 wherein each said memory tag word storage portion comprises magnetic elements arranged on at least one surface of said material, said magnetic elements being of the type which switch magnetic poles in response to a planar rotating magnetic field whereby said poles attract and hold domains, said magnetic elements being arranged to cause domains stored in said portion to move sequentially through a plurality of locations defined by said poles, a particular one of said locations being close enough to said first location of said identifying bit storage location to result in a domain in said particular location exerting a repelling force on a domain in said first location along said axis in a first direction.

5. An associative memory as claimed in claim 4 wherein each said search word holding means comprises magnetic elements arranged on at least one surface of said material, said magnetic elements being of the type which switch magnetic poles in response to a planar rotating magnetic field whereby said poles attract and hold domains, said magnetic elements arranged to cause domains stored in said search word holding means to move sequentially through a plurality of locations defined by said poles, a particular one of said locations being close enough to the first location of said adjacent identifying bit storage location to result in a domain in said particular location exerting a repelling force on a domain in said first location along said axis in a second direction.

6. An associative memory as claimed in claim 5 further comprising means for detecting the presence of domains in the first locations of said N identifying bit storage portions and means for holding the magnetic domains comprising the identifying bits in said first locations during comparison of masked bits of said search word with corresponding bits of each of said memory tag word.

* * * * *

UNITED STATES PATENT OFFICE
CERTIFICATE OF CORRECTION

Patent No. 3,760,390 Dated September 18, 1973

Inventor(s) Hiroshi MURAKAMI

It is certified that error appears in the above-identified patent and that said Letters Patent are hereby corrected as shown below:

Column 3, line 13, "result in"......should read.......result is.

Signed and sealed this 16th day of April 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
U.S. GOVERNMENT PRINTING OFFICE : 1969 O—366-334